Patented Aug. 12, 1952

2,606,889

UNITED STATES PATENT OFFICE 2,606,889

MOLDING COMPOSITIONS CONTAINING TWO-STAGE PHENOL-ALDEHYDE RESINS AND AN ALKALINE EARTH METAL BORATE

Terence Ward, West Wickham, and James Harold Williams, Edgware, England, assignors to Imperial Chemical Industries Limited, a corporation of Great Britain No Drawing. Application April 18, 1949, Serial No. 88,225. In Great Britain April 30, 1948

19 Claims. (Cl. 260—59)

This invention relates to improved phenol-aldehyde moulding compositions.

By the expression "phenol-aldehyde moulding compositions" we mean filled or unfilled resin compositions in a state of subdivision suitable for feeding into moulds used in the art and in which the resin component is a two-stage phenol-aldehyde resin formed by combining a novolac and hexamethylene tetramine, the degree of condensation of the resin being such that the composition has a satisfactory "flow" when pressure is applied to it in a hot mould and which can be cured by the application of heat and pressure to the infusible, insoluble stage.

By a "novolac" we mean a permanently fusible, soluble condensation product of an aldehyde such as, for example, formaldehyde or furfural, with phenol, m-cresol, resorcinol or 3:5-xylenol or commercially available mixtures of these and their isomers in which the molecular ratio of aldehyde to phenolic compound is not greater than 1:1. Formaldehyde is the preferred aldehyde and is preferably used in the form of an aqueous solution, on account of its availability, cost and ease of reaction. These condensation products are normally prepared in the presence of an acid condensation catalyst.

Thermosetting moulding compositions are produced by blending together the novolac and the hexamethylene tetramine and, if desired, one or more fillers, a mould lubricant, for example stearin, a basic material such as lime or magnesia and any other desired ingredients such as plasticisers, and dyes and/or pigments and thereafter malaxating the blend, for example in a "Banbury" mixer and/or on heated rolls until the composition has the desired "flow" and the constituents of the blend are well mixed together. The compositions are then converted to a form suitable for loading into moulds or compacting in pelleting machines. Suitable fillers for such compositions include woodflour, paper, cotton in various forms, mica and asbestos. If compositions suitable for the production of high impact strength mouldings are desired, fillers in the form of string or diced fabric may be used. The compositions may then be prepared by mixing the novolac, which may be in the form of an aqueous or spirit solution or aqueous suspension, and hexamethylene tetramine with the fillers and other ingredients in a suitable mixer such as an edge runner mill or a Baker Perkins mixer until the fillers are well impregnated with the resin and thereafter drying, heating being continued until the compositions have the required "flow."

Mouldings prepared from phenol-aldehyde moulding compositions especially those containing resins made from commercially available mixtures of cresols and xylenols, often suffer from the disadvantages of being slow to cure and being difficult to remove from hot moulds because they tend to be soft at the temperature of the mould. This softness may lead to deformation and damage to the moulding during removal from the mould. The mouldings may also stick to the moulds and may even require the use of considerable force in their extraction therefrom. These difficulties, as will be readily appreciated by those skilled in the art, cause a decreased speed of production and increased cost of articles moulded from such compositions. These difficulties can be overcome, as disclosed in our copending application Serial No. 13,943, by incorporating a boric acid into the moulding composition. In the improved moulding powders of application Serial No. 13,943 it is preferred also to incorporate an alkali, such as lime or magnesia since this assists in preventing sticking of the moulded article to the mould.

An object of the present invention is to provide a process for the production of improved phenol-aldehyde moulding compositions. Another object is to provide a process for the production of phenol-aldehyde moulding compositions having increased rates of cure. A further object is to provide a process for the production of phenol-aldehyde moulding compositions having increased plasticity when subjected to moulding conditions. A still further object is to provide a process for the production of phenol-aldehyde moulding compositions which give mouldings having increased hot strength. Other objects will appear hereinafter.

According to the present invention these objects are accomplished by a process comprising incorporating into a phenol-aldehyde moulding composition, as hereinbefore defined, at any stage during its production, an alkaline earth metal borate in amount from 1 to 20 per cent by weight of the two-stage resin and preferably from 2 to 8 per cent.

The alkaline earth metal borate may be used alone or in combination with a boric acid, e. g. orthoboric acid in amount up to 5 per cent, and may be added to the other ingredients in any desired manner at any stage prior to or during the final working of the composition for example, it may be suspended in the resin, it may also be added in a dry state to the novolac or any of the other ingredients before the initial blending takes place. Alternatively, it may be added to the blended material before or during malaxation. It is preferred, however, to add the alkaline earth metal borate at an initial blending stage of the novolac with the other ingredients as this method is most convenient for plant operation.

Suitable alkaline earth metal borates for use in the process of this invention include magnesium, calcium and barium borates. Calcium metaborate is the preferred alkaline earth metal borate for use in the process of this invention. Mixtures of calcium metaborate and orthoboric acid are further preferred as being most effective in achieving the objects of the invention.

It is preferred in the production of the moulding compositions of this invention to incorporate a basic substance, preferably an alkaline earth metal oxide or hydroxide, as this reduces the tendency of hot moulded articles to stick in the mould. It is further preferred that lime or magnesia be incorporated into the improved compositions of this invention. In preferred embodiments of this invention the moulding compositions have incorporated therein 1 to 4.5% of lime or magnesia. When 6–7% of alkaline earth metal borate is used it is preferred to use 1% of lime or magnesia, these percentages being by weight of the two-stage resin.

For many purposes it is desirable to have phenol-aldehyde moulding composition of stiff "flow." These are difficult to produce when using a boric acid in the composition due to a tendency to "balling up" during the working of such powders. When a boric acid is incorporated into such powders at the initial blending stage its effect is such that when once the composition begins to harden during working it tends to harden very rapidly and thus makes it extremely difficult to continue malaxation until the desired flow has been reached. Satisfactory powders of stiff "flow" have, however, been produced both with and without the incorporation of a boric acid. The use of the process of the present invention enables improved stiff flow powders to be produced in an easily controlled manner.

A particularly useful feature of this invention is that it enables stiff flow powders having the same rates of cure as those having a boric acid incorporated therewith to be produced without the undesirable excessive hardening such powders are liable to suffer on prolonged working when hot.

Our invention is further illustrated by the following example, but it is to be understood that our invention is in no way limited by the example.

*Example*

Two moulding compositions were made from a phenol-formaldehyde novolac resin (prepared from commercial phenol) by compounding together on hot rolls the ingredients shown in the following table.

The moulding properties of the resulting compositions which are shown in the table are (*a*) cup flow (as determined by the method of B. S. S. 771), (*b*) cup cure (minimum time to produce a blister free moulding in the B. S. S. 771 cup flow test, the time being measured from the moment the mould is completely closed to the moment when the mould is opened), (*c*) the ease of extraction of the moulding from the mould, and (*d*) the "ease of deformation" of the hot moulding immediately on removal from the mould.

The "ease of deformation" is an arbitrary measure of the hot strength of the moulding and is determined by the following method. The hot cup is taken straight from the mould and immediately placed on its side in an apparatus containing a suitably shaped depression such that the cup lies with its axis of symmetry in a horizontal plane. A loaded plunger (total load 10.5 lbs.) which is constructed of a semi-circular piece of flat $\frac{1}{16}$" thick mild steel plate having a radius of $\frac{3}{8}$" is then lowered on to the upper surface of the cup near the open end. The point of contact of the plunger is $\frac{3}{4}$" from the open end of the cup and vertically above the central axis. Under this deforming load, the sides of the cup are partially squeezed together. The decrease in diameter of the open end, calculated as a percentage of the original diameter, is termed the "ease of deformation."

*Table*

| | Parts by weight | |
|---|---|---|
| Phenol-formaldehyde novolac resin | 40.0 | 40.0 |
| Woodflour | 49.0 | 49.0 |
| Hexamethylene tetramine | 5.0 | 5.0 |
| Calcium hydroxide | 1.0 | 1.0 |
| Stearic acid | 1.5 | 1.5 |
| Nigrosine | 1.5 | 1.5 |
| Calcium metaborate | 3.0 | |
| Total | 101.0 | 98.0 |
| (*a*) Cup flow (secs.) | 8 | 10 |
| (*b*) Cup cure (secs.) | 50 | 55 |
| (*c*) Ease of extraction | Perfect | Sticks |
| (*d*) Ease of deformation (after 60 secs. cure) | 25.0 | 43.75 |

We claim:

1. A process for the production of improved compositions from moldable, thermosetting resin compositions in which the resin component is a 2-stage phenol-aldehyde resin formed by combining an unmodified novolac and hexamethylene tetramine which comprises incorporating into the resin composition, an alkaline earth borate in an amount of from 1 to 20% by weight of the resin component.

2. A process according to claim 1 wherein the alkaline earth metal borate is used in amount from 2 to 8 percent.

3. A process according to claim 1 wherein a boric acid which contains only hydrogen, boron and oxygen atoms is also incorporated into the phenol-aldehyde moulding composition in an amount up to 5% by weight of the resin component.

4. A process according to claim 1 wherein the alkaline earth metal borate is incorporated at an initial blending stage of the novolac with the hexamethylene tetramine.

5. A process according to claim 1 wherein the resin comprises a novolac formed by the condensation of formaldehyde with a phenol.

6. A process according to claim 1 wherein a basic substance selected from the group consisting of the alkaline earth metal oxides and hydroxides is also incorporated in the resin composition in an amount of from 1 to 4.5% by weight of the two-stage resin.

7. A process according to claim 1 wherein a basic substance in an amount of from 1 to 4.5% by weight of the 2-stage resin is incorporated into said resin composition, said basic substance being selected from the group consisting of lime and magnesia.

8. A process as claimed in claim 7 wherein 1% of said basic substance and from 6 to 7% of the alkaline earth metal borate is used.

9. A process according to claim 1 wherein the alkaline earth metal borate is selected from the group consisting of the borates of magnesium, calcium and barium.

10. A process according to claim 9 wherein the alkaline earth metal borate is calcium metaborate.

11. A process according to claim 1 wherein orthoboric acid in an amount up to 5% by weight of the resin component is also incorporated into the resin composition.

12. An improved phenol-aldehyde moulding composition comprising a 2-stage phenol-aldehyde resin formed by combining an unmodified novolac and hexamethylene tetramine and an alkaline earth borate in an amount of from 1 to 20% by weight of the resin.

13. An improved phenol-aldehyde moulding composition as claimed in claim 12 wherein said alkaline earth borate is present in an amount of from 2 to 8% by weight of the resin.

14. An improved phenol-aldehyde moulding composition as claimed in claim 12 wherein said novolac is the condensation product of formaldehyde with a phenolic compound.

15. An improved phenol-aldehyde moulding composition as claimed in claim 12 wherein said alkaline earth metal borate is calcium metaborate.

16. An improved phenol-aldehyde moulding composition as claimed in claim 12 containing a basic substance selected from the group consisting of the alkaline earth metal oxides and hydroxides in an amount of from 1 to 4.5% by weight of said two-stage resin.

17. An improved phenol-aldehyde moulding composition as claimed in claim 12 containing a basic substance selected from the group consisting of lime and magnesia in an amount of from 1 to 4.5% by weight of said 2-stage resin.

18. An improved phenol-aldehyde moulding composition as claimed in claim 17 containing 1% of said basic substance and from 6 to 7% of said alkaline earth metal borate.

19. An improved phenol-aldehyde moulding composition as claimed in claim 12 containing at least one filler.

TERENCE WARD.
JAMES HAROLD WILLIAMS.

REFERENCES CITED

The following references are of record in the file of this patent:

UNITED STATES PATENTS

| Number | Name | Date |
| --- | --- | --- |
| 2,138,795 | Schmidt | Nov. 29, 1938 |
| 2,174,755 | Novotny | Oct. 3, 1939 |
| 2,235,193 | Balz | Mar. 18, 1941 |

OTHER REFERENCES

Chem. & Met. Eng., December 1935, page 661.